(12) United States Patent
Stein et al.

(10) Patent No.: US 9,053,537 B2
(45) Date of Patent: Jun. 9, 2015

(54) CLASSIFIER FOR USE IN GENERATING A DIFFUSE IMAGE

(75) Inventors: Andrew Neil Stein, Pittsburgh, PA (US); Kshitiz Garg, Pittsburgh, PA (US)

(73) Assignee: Tandent Vision Science, Inc., San Francisco, CA (US)

( * ) Notice: Subject to any disclaimer, the term of this patent is extended or adjusted under 35 U.S.C. 154(b) by 64 days.

(21) Appl. No.: 13/200,204

(22) Filed: Sep. 21, 2011

(65) Prior Publication Data
US 2013/0071033 A1    Mar. 21, 2013

(51) Int. Cl.
  G06K 9/48    (2006.01)
  G06T 5/00    (2006.01)
  G06T 7/00    (2006.01)

(52) U.S. Cl.
  CPC ............. G06T 5/002 (2013.01); G06T 7/0085 (2013.01); G06T 7/0087 (2013.01); G06T 2207/20076 (2013.01); G06T 2207/20192 (2013.01)

(58) Field of Classification Search
  CPC ..... G06T 7/0081; G06T 5/002; G06T 7/0085; G06T 2207/20012; G06T 2207/20192; G06T 5/007; G06T 2207/20136; G06T 5/003; G06T 2207/20104; G06T 2207/20116; G06T 2207/20076; G06K 9/4661; G06K 9/4638
  USPC ......................................... 382/181, 199, 231
  See application file for complete search history.

(56) References Cited

U.S. PATENT DOCUMENTS

| | | | |
|---|---|---|---|
| 6,229,578 B1 | 5/2001 | Acharya et al. | |
| 7,596,266 B2 | 9/2009 | Maxwell et al. | 382/167 |
| 7,672,530 B2 | 3/2010 | Friedhoff et al. | 382/266 |
| 7,873,219 B2 | 1/2011 | Friedhoff et al. | 382/199 |
| 7,912,312 B2 * | 3/2011 | Hsieh et al. | 382/269 |
| 2002/0031268 A1 | 3/2002 | Prabhakar et al. | |
| 2008/0226175 A1 * | 9/2008 | Suzuki et al. | 382/190 |
| 2009/0185050 A1 | 7/2009 | Chung et al. | |
| 2010/0142805 A1 * | 6/2010 | Maxwell et al. | 382/164 |
| 2010/0142825 A1 | 6/2010 | Maxwell et al. | 382/199 |
| 2011/0150358 A1 | 6/2011 | Smith et al. | 382/274 |
| 2011/0222742 A1 | 9/2011 | Stein et al. | 382/118 |
| 2012/0243790 A1 * | 9/2012 | Campbell et al. | 382/199 |

OTHER PUBLICATIONS

Airie et al. "Fast and stable human detection using multiple classifiers based on subtraction stereo HOG features." 2011 IEEE International Conference on Robotics and Automation, May 9, 2011.
Jianhong (Jackie) Shen, "Inpainting and the Fundamental Problem of Image Processing", SIAM News, vol. 36, No. 5, Jun. 2003.

* cited by examiner

*Primary Examiner* — Edward Park
(74) *Attorney, Agent, or Firm* — Davidson, Davidson & Kappel, LLC; Felix L. D'Arienzo, Jr.

(57) ABSTRACT

In a first exemplary embodiment of the present invention, an automated, computerized method is provided for processing an image. According to a feature of the present invention, the method comprises the steps of providing an image file depicting an image, in a computer memory, providing a multi-class classifier trained to identify edges in an image relative to computer actions to be taken in respect to the respective edges, determined as a function of illumination effects in the image and utilizing the multi-class classifier to classify edges in the image, for identification of computer actions to be taken in respect to the edges in the image.

20 Claims, 11 Drawing Sheets

Illumination Edge Classifier

Pixel Array for Storing Image Data

| P(1, 1) | P(1, 2) | ... | | ... | P(1, M) |
|---|---|---|---|---|---|
| P(2, 1) | P(2, 2) | | | | ⋮ |
| P(3, 1) | P(3, 2) | | | | ⋮ |
| ⋮ | | | | | |
| ⋮ | | | | | ⋮ |
| P(N, 1) | ... | | | ... | P(N, M) |

Image File
⌞18

FIG. 2

Figure 4: Log Color Space Chromaticity Plane

Examples of Identifying Token Regions in an Image

Original Image

- ⊗ Teal In Shadow
- ⊙ Teal
- ⊖ Blue In Shadow
- ⊘ Blue
- ⊖ Yellow

Token Regions $$\begin{bmatrix} 1 & -1 & 0 \\ 1 & 0 & -1 \\ 0 & 1 & -1 \end{bmatrix} \begin{bmatrix} i_a \\ i_b \\ i_c \end{bmatrix} = \begin{bmatrix} i_a - i_b \\ i_a - i_c \\ i_b - i_c \end{bmatrix}$$

[A]     [x]  =    [b]

$$\begin{bmatrix} 1 & -1 & 0 \\ 1 & 0 & -1 \\ 0 & 1 & -1 \end{bmatrix} \begin{bmatrix} l_a \\ l_b \\ l_c \end{bmatrix} = \begin{bmatrix} i_a - i_b - d_{ab} \\ i_a - i_c - d_{ac} \\ i_b - i_c - d_{bc} \end{bmatrix}$$

Figure 8

Illumination Edge Classifier

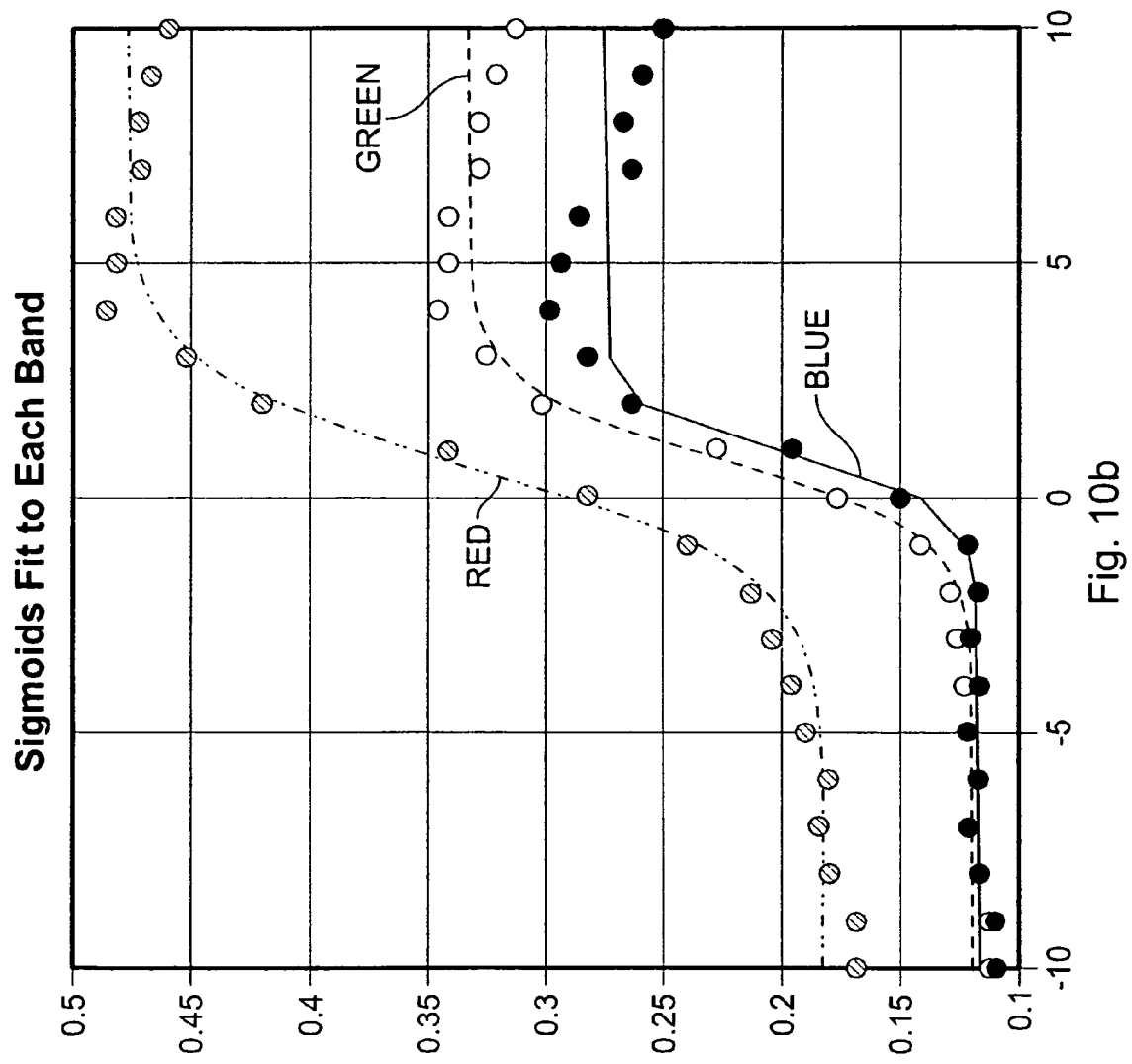

CLASSIFIER FOR USE IN GENERATING A DIFFUSE IMAGE

BACKGROUND OF THE INVENTION

Many significant and commercially important uses of modern computer technology relate to images. These include image processing, image analysis and computer vision applications. In computer vision applications, such as, for example, object recognition and optical character recognition, it has been found that a separation of illumination and material aspects of an image can significantly improve the accuracy of computer performance. Significant pioneer inventions related to the illumination and material aspects of an image are disclosed in U.S. Pat. No. 7,873,219 to Richard Mark Friedhoff, entitled Differentiation Of Illumination And Reflection Boundaries and U.S. Pat. No. 7,672,530 to Richard Mark Friedhoff et al., entitled Method And System For Identifying Illumination Flux In An Image (hereinafter the Friedhoff patents).

SUMMARY OF THE INVENTION

The present invention provides an improvement and enhancement to the fundamental teachings of the Friedhoff patents, and includes a method and system comprising image techniques that accurately and correctly identify intrinsic images corresponding to an original image of a scene. The intrinsic images include an illumination image and a material reflectance image. According to a further feature of the present invention, a diffuse image is provided to separate desirable diffuse shading aspects of illumination from potentially undesirable cast shadow and strong trend aspects of illumination, for more accurate further processing.

In a first exemplary embodiment of the present invention, an automated, computerized method is provided for processing an image. According to a feature of the present invention, the method comprises the steps of providing an image file depicting an image, in a computer memory, providing a multi-class classifier trained to identify edges in an image relative to computer actions to be taken in respect to the respective edges, determined as a function of illumination effects in the image; and utilizing the multi-class classifier to automatically label edges in the image, for identification of computer actions to be taken in respect to the edges in the image.

According to a feature of the first exemplary embodiment of the present invention, the computer actions include actions that range from no adjustment to the edges, to reduction of edges' contrast, to removal of edges.

In a second exemplary embodiment of the present invention, a computer system is provided. The computer system comprises a CPU and a memory storing an image file containing an image. According to a feature of the present invention, the CPU is arranged and configured to execute a routine to provide a multi-class classifier trained to identify edges in an image relative to computer actions to be taken in respect to the respective edges, determined as a function of illumination effects in the image and utilize the multi-class classifier to automatically label edges in the image, for identification of computer actions to be taken in respect to the edges in the image.

In a third exemplary embodiment of the present invention, a computer program product is provided. According to a feature of the present invention, the computer program product is disposed on a computer readable media, and the product includes computer executable process steps operable to control a computer to: provide an image file depicting an image, in a computer memory, provide a multi-class classifier trained to identify edges in an image relative to computer actions to be taken in respect to the respective edges, determined as a function of illumination effects in the image and utilize the multi-class classifier to automatically label edges in the image, for identification of computer actions to be taken in respect to the edges in the image.

In accordance with yet further embodiments of the present invention, computer systems are provided, which include one or more computers configured (e.g., programmed) to perform the methods described above. In accordance with other embodiments of the present invention, computer readable media are provided which have stored thereon computer executable process steps operable to control a computer(s) to implement the embodiments described above. The present invention contemplates a computer readable media as any product that embodies information usable in a computer to execute the methods of the present invention, including instructions implemented as a hardware circuit, for example, as in an integrated circuit chip. The automated, computerized methods can be performed by a digital computer, analog computer, optical sensor, state machine, sequencer, integrated chip or any device or apparatus that can be designed or programed to carry out the steps of the methods of the present invention. Advantageously, the present invention can be implemented to improve the generation of a diffuse image, or for processing an original image relative to shadow removal or modification.

BRIEF DESCRIPTION OF THE DRAWINGS

FIG. 2 shows an n×m pixel array image file for an image stored in the computer system of FIG. 1.

FIG. 6b shows Type C token regions in the image of FIG. 6a.

FIG. 8 is a representation of an [A][x]=[b] matrix relationship used to identify and separate illumination and material aspects of an image, according to a smooth-illumination constraint feature of the present invention.

FIG. 10b is a graph depicting a sigmoid fit to red, green, blue bands of pixels of an image edge being classified pursuant to the routine of FIG. 9.

DETAILED DESCRIPTION OF THE PREFERRED EMBODIMENTS

Figure 1:
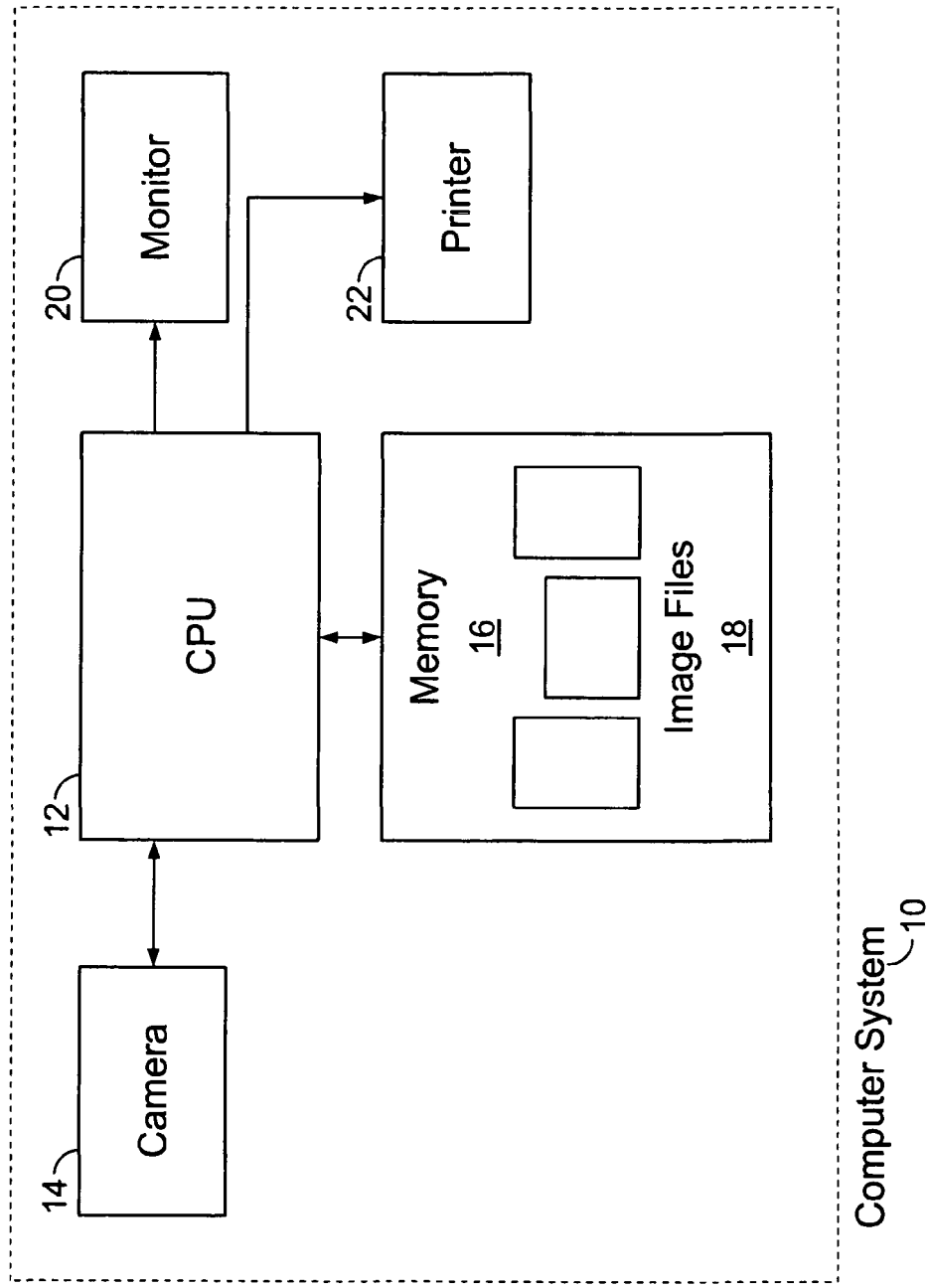
FIG. 1 is a block diagram of a computer system arranged and configured to perform operations related to images.

Referring now to the drawings, and initially to FIG. 1, there is shown a block diagram of a computer system 10 arranged and configured to perform operations related to images. A CPU 12 is coupled to a device such as, for example, a digital camera 14 via, for example, a USB port. The digital camera 14 operates to download images stored locally on the camera 14, to the CPU 12. The CPU 12 stores the downloaded images in a memory 16 as image files 18. The image files 18 can be accessed by the CPU 12 for display on a monitor 20, or for print out on a printer 22.

Alternatively, the CPU 12 can be implemented as a microprocessor embedded in a device such as, for example, the digital camera 14 or a robot. The CPU 12 can also be equipped with a real time operating system for real time operations related to images, in connection with, for example, a robotic operation or an interactive operation with a user.

As shown in FIG. 2, each image file 18 comprises an n×m pixel array. Each pixel, p, is a picture element corresponding to a discrete portion of the overall image. All of the pixels together define the image represented by the image file 18. Each pixel comprises a digital value corresponding to, for example, a set of color bands, for example, red, green and blue color components (RGB) of the picture element, or a single grayscale value. The present invention is applicable to any multi-band image, where each band corresponds to a piece of the electro-magnetic spectrum, or to a single grayscale image depiction. The pixel array includes n rows of m columns each, starting with the pixel p (1,1) and ending with the pixel p(n, m). Thus, each pixel can be uniquely identified by p(r,g,b,x,y) wherein the r,g,b values provide the pixel color, and x,y the position within the n×m pixel array of FIG. 2. When displaying or printing an image, the CPU 12 retrieves the corresponding image file 18 from the memory 16, and operates the monitor 20 or printer 22, as the case may be, as a function of the digital values of the pixels in the image file 18, as is generally known.

According to a feature of the present invention, in an image process, the CPU 12 operates to analyze and process information, for example, the RGB values of the pixels of an image stored in an image file 18, to achieve various objectives, such as, for example, a correct and accurate identification of illumination and material aspects of the image. The present invention provides a method and system for generation of intrinsic images. The intrinsic images correspond to an original image, for example, an image depicted in an input image file 18. The intrinsic images include, for example, an illumination image, to capture the intensity and color of light incident upon each point on the surfaces depicted in the image, and a material reflectance image, to capture reflectance properties of surfaces depicted in the image (the percentage of each wavelength of light a surface reflects).

Figure 3:
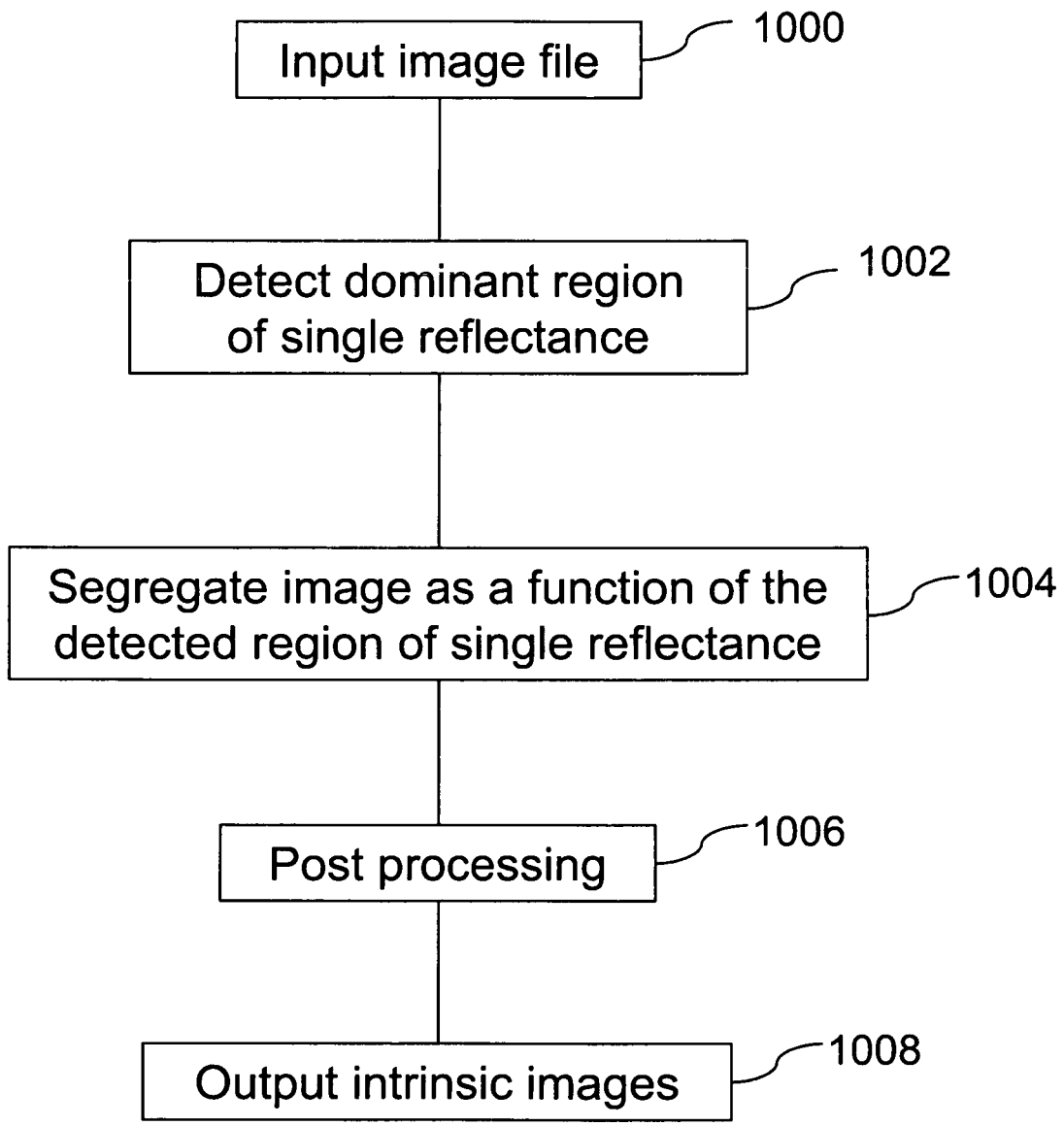
FIG. 3 is a flow chart for performing an operation to generate intrinsic images, using a single reflectance technique, according to a feature of the present invention.

Images depicted in some image files 18 are dominated by a single material, for example, a lawn in a sports playing field, or skin in a human face. In such a case, the present invention utilizes the fact of the dominance of a single reflectance region of an image, to improve computer operations relevant to the generation of intrinsic images. To that end, FIG. 3 shows a flow chart for performing an operation to generate intrinsic images, using a single reflectance technique, according to a feature of the present invention.

In step 1000 a selected image file 18 is input to the CPU 12. In step 1002, the CPU 12 executes a routine to detect a dominant image region of a single reflectance. According to a feature of the present invention, any one of several different methods can be implemented to detect the region of single reflectance. For example, step 1002 can be implemented via alternative methods, such as, for example, a log chromaticity clustering method, a large token analysis, a pixel stability analysis or a spectral analysis, as will appear.

In step 1004, the CPU 12 segregates the image as a function of the detected dominant, single reflectance region of the image depicted in the input image file 18. The segregation can be performed by the CPU 12 through execution of any one of several techniques, for example, a constraint/solver model, or a computation based upon pixels of the detected region of single reflectance. In step 1006, the CPU 12 performs post processing, such as, for example, a factoring of the illumination to provide an image illuminated by diffuse illumination, as will be described in more detail below, then outputs intrinsic images corresponding to the image of the input image file 18 (step 1008).

In the performance of step 1002 using log chromaticity clustering, the CPU 12 computes an illumination-invariant log chromaticity value for each pixel of the input image file 18. Log chromaticity is a technique for developing a two dimensional illumination invariant chromaticity space. A method and system for separating illumination and reflectance using a log chromaticity space is disclosed in U.S. Pat. No. 7,596,266, which is hereby expressly incorporated by reference. The techniques taught in U.S. Pat. No. 7,596,266 can be used to provide illumination invariant log chromaticity representation values for each pixel of an image.

Logarithmic values of the color band values of the image pixels are plotted on a log-color space graph. The logarithmic values are then projected to a log-chromaticity projection plane oriented as a function of a bi-illuminant dichromatic reflection model (BIDR model), to provide a log chromaticity value for each pixel, as taught in U.S. Pat. No. 7,596,266. The BIDR Model predicts that differing color measurement values fall within a cylinder in RGB space, from a dark end (in shadow) to a bright end (lit end), along a positive slope, when the color change is due to an illumination change forming a shadow over a single material of a scene depicted in the image.

Figure 4:
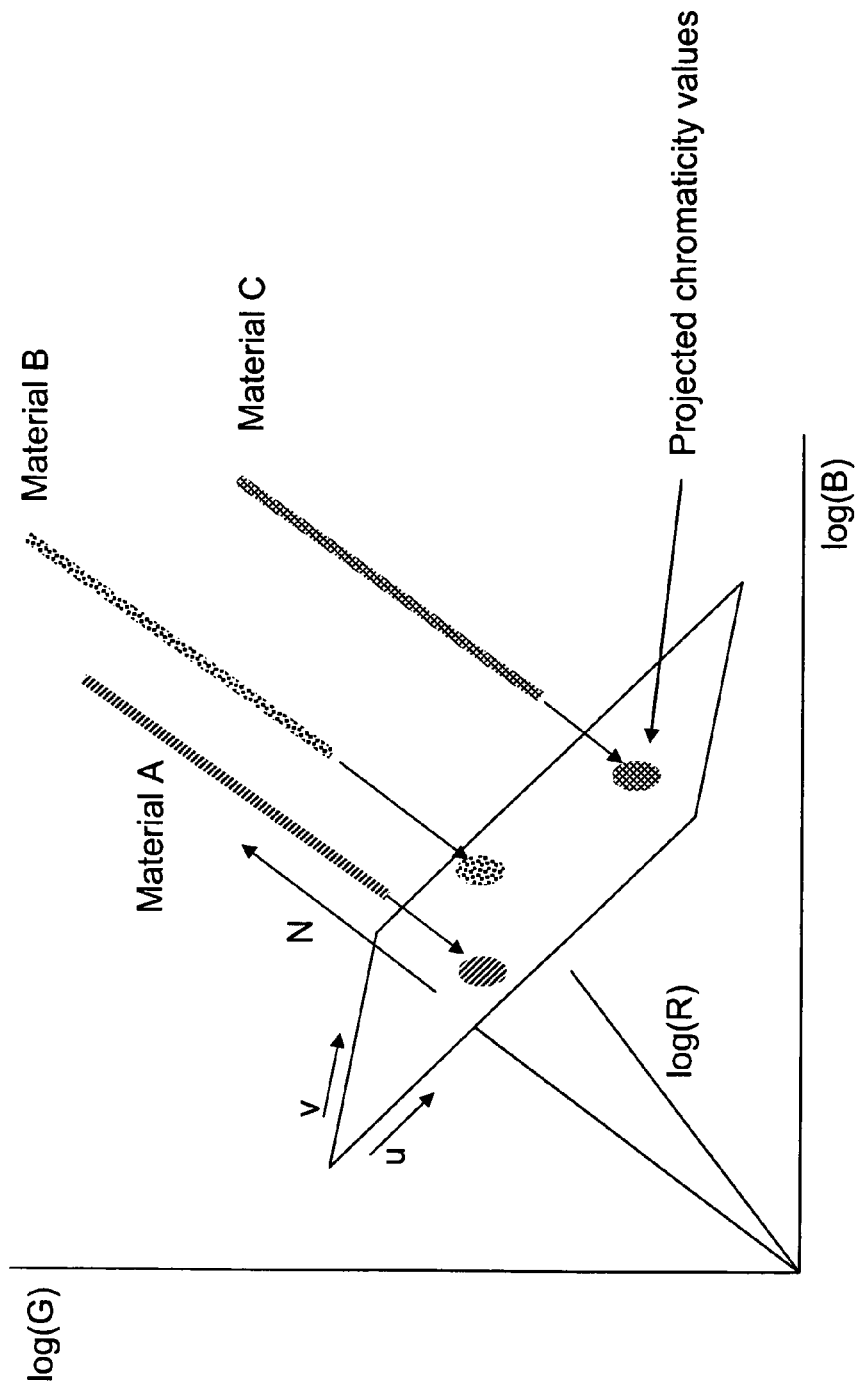
FIG. 4 is a graphic representation of a log color space chromaticity plane according to a feature of the present invention.

FIG. 4 is a graphic representation of a log color space, bi-illuminant chromaticity plane according to a feature of the invention disclosed in U.S. Pat. No. 7,596,266. The alignment of the chromaticity plane is determined by the vector N, normal to the chromaticity plane, and defined as $N=\log(\text{Bright}_{vector})-\log(\text{Dark}_{vector})=\log(1+1/S_{vector})$. The co-ordinates of the plane, u, v can be defined by a projection of the green axis onto the chromaticity plane as the u axis, and the cross product of u and N being defined as the v axis. In our example, each log value for the materials A, B, C is projected onto the chromaticity plane, and will therefore have a corresponding u, v co-ordinate value in the plane that is a chromaticity value, as shown in FIG. 4.

Thus, the RGB values of each pixel in an image file 18 can be mapped by the CPU 12 from the image file value p(n, m, R, G, B) to a log value, then, through a projection to the chromaticity plane, to the corresponding u, v value, as shown in FIG. 4. Each pixel p(n, m, R, G, B) in the image file 18 is then replaced by the CPU 12 by a two dimensional chromaticity value: p(n, m, u, v), to provide a chromaticity representation of the original RGB image. In general, for an N band image, the N color values are replaced by N−1 chromaticity values. The chromaticity representation is a truly accurate illumination invariant representation because the BIDR model upon which the representation is based, accurately and correctly represents the illumination flux that caused the original image.

Accordingly, all of the pixels of the input image file 18 representing the dominant region of single reflectance, for example, pixels corresponding to skin in an image depicting a human face, will have a similar log chromaticity value (within the noise level of the device used to record the image, for example, the camera 14), and be within a single cluster. The CPU 12 can implement any known clustering algorithm, to cluster pixel log chromaticity values. Pixels representing regions of the image other than the skin, for example, eyebrows, lips, the iris of the eye, and so on, will fall outside the single cluster corresponding to skin pixels. Thus, all pixels within the single large cluster will be designated as being in the dominant region of single reflectance.

Figure 5:
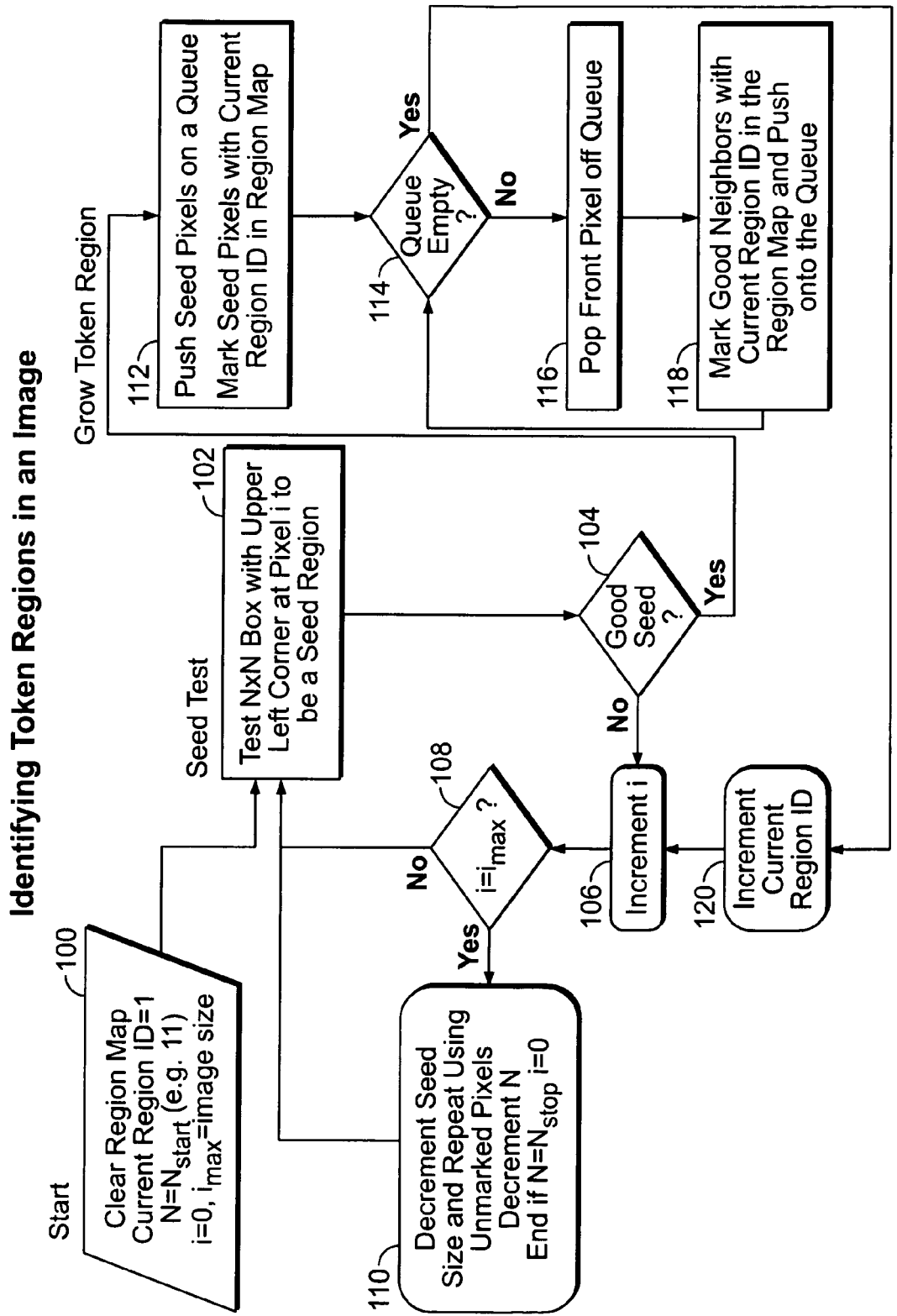
FIG. 5 is a flow chart for identifying Type C token regions in the image file of FIG. 2a, according to a feature of the present invention.

In the performance of step 1002 using the alternative large token analysis, the CPU 12 initially computes Type C tokens. Referring now to FIG. 5, there is shown a flow chart for a tokenization method for generating Type C token regions, according to a feature of the present invention. A $1^{st}$ order uniform, homogeneous Type C token comprises a single robust color measurement among contiguous pixels of the image. At the start of the identification routine of FIG. 5, the CPU 12 sets up a region map in memory. In step 100, the CPU 12 clears the region map and assigns a region ID, which is initially set at 1. An iteration for the routine, corresponding to a pixel number, is set at i=0, and a number for an N×N pixel array, for use as a seed to determine the token, is set an initial value, $N=N_{start}$. $N_{start}$ can be any integer >0, for example it can be set at set at 11 or 15 pixels.

At step 102, a seed test is begun. The CPU 12 selects a first pixel, i=(1, 1) for example (see FIG. 2), the pixel at the upper left corner of a first N×N sample of the image file 18. The pixel is then tested in decision block 104 to determine if the selected pixel is part of a good seed. The test can comprise a comparison of the color value of the selected pixel to the color values of a preselected number of its neighboring pixels as the seed, for example, the N×N array. The color values comparison can be with respect to multiple color band values (RGB in our example) of the pixel or the filter output intensity histogram representation of the pixel, in the event the image was filtered for texture regions, as described above.

If the comparison does not result in approximately equal values (for example, within the noise levels of the recording device for RGB values) for the pixels in the seed, the CPU 12 increments the value of i (step 106), for example, i=(1, 2), for a next N×N seed sample, and then tests to determine if $i=i_{max}$ (decision block 108).

If the pixel value is at $i_{max}$, a value selected as a threshold for deciding to reduce the seed size for improved results, the seed size, N, is reduced (step 110), for example, from N=15 to N=12. In an exemplary embodiment of the present invention, $i_{max}$ can be set at i=(n, m). In this manner, the routine of FIG. 5 parses the entire image at a first value of N before repeating the routine for a reduced value of N.

After reduction of the seed size, the routine returns to step 102, and continues to test for token seeds. An $N_{stop}$ value (for example, N=2) is also checked in step 110 to determine if the analysis is complete. If the value of N is at $N_{stop}$, the CPU 12 has completed a survey of the image pixel arrays and exits the routine.

If the value of i is less than $i_{max}$, and N is greater than $N_{stop}$, the routine returns to step 102, and continues to test for token seeds.

When a good seed (an N×N array with approximately equal pixel values) is found (block 104), the token is grown from the seed. In step 112, the CPU 12 pushes the pixels from the seed onto a queue. All of the pixels in the queue are marked with the current region ID in the region map. The CPU 12 then inquires as to whether the queue is empty (decision block 114). If the queue is not empty, the routine proceeds to step 116.

In step 116, the CPU 12 pops the front pixel off the queue and proceeds to step 118. In step 118, the CPU 12 marks "good" neighbors around the subject pixel, that is neighbors approximately equal in color value to the subject pixel, with the current region ID. All of the marked good neighbors are placed in the region map and also pushed onto the queue. The CPU 12 then returns to the decision block 114. The routine of steps 114, 116, 118 is repeated until the queue is empty. At that time, all of the pixels forming a token in the current region will have been identified and marked in the region map as a Type C token. In the event the pixels comprise intensity histogram representations, the token can be marked as Type $C_T$.

When the queue is empty, the CPU 12 proceeds to step 120. At step 120, the CPU 12 increments the region ID for use with identification of a next token. The CPU 12 then returns to step 106 to repeat the routine in respect of the new current token region.

Figure 6A:
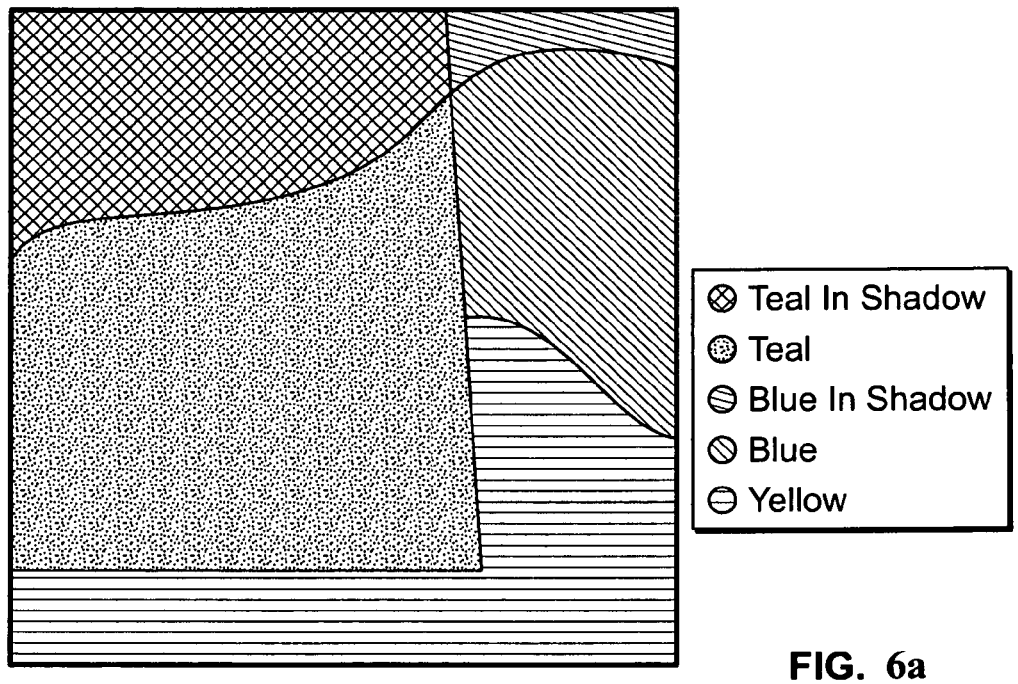
FIG. 6a is an original image used as an example in the identification of Type C tokens.
Figure 6B:
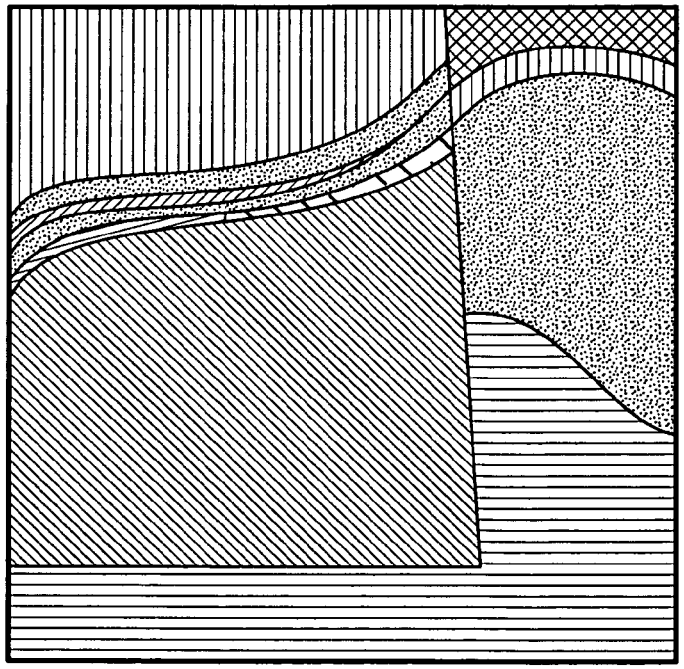

Upon arrival at $N=N_{stop}$, step 110 of the flow chart of FIG. 5, or completion of a region map that coincides with the image, the routine will have completed the token building task. FIG. 6a is an original image used as an example in the identification of tokens. The image shows areas of the color blue and the blue in shadow, and of the color teal and the teal in shadow. FIG. 6b shows token regions corresponding to the region map, for example, as identified through execution of the routine of FIG. 5 (Type C tokens), in respect to the image of FIG. 6a. The token regions are color coded to illustrate the token makeup of the image of FIG. 6a, including penumbra regions between the full color blue and teal areas of the image and the shadow of the colored areas.

In the token size analysis implementation of step 1002, upon the identification of Type C tokens in the selected input image file 18, the CPU 12 performs an analysis of the identified Type C tokens. Type C tokens that include, for example, skin pixels will be large relative to tokens corresponding to pixels representing other features of the face, for example, eyebrows, lips, the iris of the eye, and so on. Thus, a threshold value for a number of pixels in a token can be set so as to be able to identify relatively large tokens, and thereby establish the region of a dominant, single reflectance. For example, the threshold size can be set as a function of the interocular distance (the distance between the eyes), such as: threshold= (interocular distance in pixels)/7.

In the performance of step 1002 using stability analysis, the CPU 12 operates to characterize the stability of pixels in an input image file 18 and defines a dominant region of single reflectance as a function of the pixel stability measurements. For example, the pixels of identified Type C tokens can be analyzed as to stability, the tokens included in the dominant region if the constituent pixels are stable. In a stability analysis, focus is placed upon how similar a subject pixel is to neighboring pixels. Pixels in a dominant region of an image will be similar to a large number of neighboring pixels. Stability can be measured using several different methods.

For example, second derivative energy can be used to indicate the stability of pixels of an image. In this approach, the CPU 12 calculates a second derivative at each pixel, or a subset of pixels disbursed across the image to cover all illumination conditions of the image depicted in an input image file 18, of the image depicted in an input image file 18, using a Difference of Gaussians, Laplacian of Gaussian, or similar filter. The second derivative energy for each pixel examined can then be calculated by the CPU 12 as the average of the absolute value of the second derivative in each color band (or the absolute value of the single value in a grayscale image), the sum of squares of the values of the second derivatives in each color band (or the square of the single value in a grayscale image), the maximum squared second derivative value across the color bands (or the square of the single value in a grayscale image), or any similar method. The sigma of the gaussian (defining the size of the second derivative filter) is adjusted to interocular distance when the subject image depicts a face.

Upon the calculation of the second derivative energy for each of the pixels, the CPU 12 analyzes the energy values of the pixels. There is an inverse relationship between second derivative energy and pixel stability, the higher the energy, the less stable the corresponding pixel. In an image having a dominant region of single reflectance, all of the pixels in the dominant region will have a similar low second derivative energy. The CPU 12 can identify all such pixels and thereby identify the dominant region of the image.

In a second method for measuring pixel stability, the CPU 12 utilizes a second derivative relative to a vertical direction. This is an approach based upon a recognition of the fact that certain features of the geometry of a face, for example, eyes, eyebrows, nostrils and lips, tend to be horizontally aligned features of a face. Thus, an image can be evaluated in the vertical direction by convolving an image horizontally with a 1-d gaussian filter of some sigma, and then vertically by a 1-d laplacian of gaussian filter. The sigma values used in each convolution process can be set based upon the interocular distance. The result provides second derivative energy information in the vertical direction, which can be used to detect horizontal stripes formed by eyes, eyebrows and lips, while ignoring vertical features such as vertical shadow boundaries. The second derivative energy in the vertical direction can be converted to a single value per pixel, for a stability analysis similar to the second derivative energy method described above.

According to a third method, the CPU 12 applies a bilateral filter to the image. A bilateral filter is an edge preserving blurring filter. The filter changes each pixel value to a weighted average of pixels surrounding a subject pixel. The weights in the weighted average correspond to how similar the surrounding pixels are to the subject pixel both in terms of spectral properties and spatial properties. Thus, a nearby pixel of similar color will have a high weight, while a distant pixel of dissimilar color will have a low weight.

While the weighted average is the typically used output of a known bilateral filter, according to a feature of the present invention, the sum of the weights that go into the weighted average is used to measure pixel stability. The higher the weight, the more similar a pixel is to more of nearby neighbors, and thus, the more stable it is. Each pixel in a dominant region of single reflectance will have a sum of weights for the surrounding pixels which is higher than the pixels representing other areas of the image. The size of the bilateral filter and the threshold for the sum of weights can be adjusted according to the interocular distance. As in the previous methods, this factor is evaluated by the CPU 12 to identify the dominant region in the image.

Stability of pixels can also be evaluated relative to local variance in pixel values. The CPU 12 calculates and evaluates the variance in red, green and blue values in a region surrounding each pixel (or variance in the single value for a grayscale image). The size of the region can be based upon interocular distance in an image depicting a face. The higher the variance, the less stable the pixel. Thus, the evaluation can be based upon the inverse relationship between stability and variance to identify a dominant region.

Each of the above methods for detecting pixel stability produces a value corresponding to the stability of each pixel. The stability values can be used to detect a dominant region by placing a threshold on the values at a preselected value determined empirically: for instance, all pixels which have a sufficiently low variance can be considered stable, and is included in the dominant region. The specific threshold used in all image can be set at a conservative level, for example, the $40^{th}$ percentile local standard deviation. Any pixel more stable than the $40^{th}$ percentile local standard deviation is classified, for example, as skin in a face image.

Such a conservative threshold value would result in a highly accurate classification of skin pixels. However, there may still be many additional skin pixels in the remaining 60% of the image. On the other hand, assuming 2% of a face image is involved in edges between skin and non-skin, a $98^{th}$ percentile threshold would encompass all skin pixels. But such a high threshold value would produce results that also include many non-skin pixels. Thus, a single threshold value applied to all images would not necessarily yield the best result for any particular image.

According to a feature of the present invention, an adaptive stability technique is implemented to vary the specific threshold values to be used among different images. For example, the threshold used in any particular image is set as a function of the distribution of stabilities within the particular image. In an exemplary embodiment of the present invention, the CPU 12 is operated to perform an interpolation to determine a threshold value most suitable for a particular image, between the $40^{th}$ percentile and the $98^{th}$ percentile.

Empirically, such an interpolation is best performed implementing an exponential function. For example, a determination is made of the log of the $40^{th}$ percentile and the log of the $98^{th}$ percentile for a particular image. Then a linear interpolation is performed between the $40^{th}$ and $98^{th}$ percentiles and another value, for example the value at the $55^{th}$ percentile, then exponentiate. For example:

$$\text{Threshold}=\exp(55-40)/(98-40)*(\log(98)-\log(40))+\log(40)$$

In an exemplary embodiment of the present invention, the stability processing is performed as a function of tokens. The stability of each token is determined based upon the stability of the constituent pixels of the token. For example, each token of the image is measured by the mean, median, max, min, $90^{th}$ percentile, $10^{th}$ percentile, or any other measure relative to the stability values of the constituent pixels of each respective token. If the chosen measure, for example, the median stability measure, is stable relative to the threshold selected for the respective image, the corresponding token is classified as stable.

The pixel stabilities can be optionally blurred prior to thresholding. Additionally, the resulting region after thresholding can be optionally eroded to remove isolated points and/or dilated to fill in holes.

According to a further exemplary embodiment of the present invention, the performance of step 1002 can be implemented using a spectral analysis. For example, if it is known or expected that the dominant region is a particular color, for example, green for grass in the playing filed of a stadium, then all pixels that are sufficiently similar to the expected color of the dominant region are placed in the region.

Once a dominant region of single reflectance is identified (step 1002), the CPU 12 proceeds to step 1004 to segregate the image into illumination and material aspects of the image.

If, for example, the log chromaticity method was implemented to identify the region of single reflectance, the CPU 12 can identify the illumination aspects of the image via the relationship of I=ML, wherein I is the intensity of an image pixel, as recorded and stored in the image file 18, M is the material color and L the illumination value. In the situation of an image with a single dominant region of same reflectance, the CPU 12 can assume any color for all of the pixels within the single large region identified by the CPU 12, for example, a flesh tone, and then solve the I=ML equation for the illumination value of each pixel, using the assumed material color and the recorded value for I, for each pixel of the single dominant region. The result is an illumination map corresponding to the pixels of the dominant region of single reflectance.

Any known in-filling or in-painting technique can be used to expand the illumination filed for the dominant region of single reflectance, to pixels representing other areas of the image, for example, the eyes of an image depicting a human face. For example, a thin plate spline can be fit to the calculated illumination values and used to project the values for the illumination in other areas. For a more detailed description of in-filling or in-painting techniques, reference is made to "Inpainting and the Fundamental Problem of Image Processing" by Jianhong (Jackie) Shen, SIAM News, Volume 36, Number 5, June 2003.

Alternatively, a constraint/solver model can be implemented to segregate the image (step 1004), for example, when, for example, a tokenization was performed to identify the dominant region of single reflectance. The constraint/solver model in an exemplary embodiment of the present invention is implemented according to the teachings disclosed in U.S. Patent Publication No. US 2010/0142825. All of the Type C tokens identified as being in the region of single reflectance are constrained in a matrix equation, to be of a same material. All adjacent Type C tokens of the image of the image file 18 are also constrained in a matrix equation to be in a smooth-illumination constraint.

A smooth-illumination constraint can be used to determine the illumination in regions of the image including regions of the image that are outside the dominant region. In a smooth-illumination constraint, the constraint is based upon the average illumination of the pixels near a shared boundary between adjacent Type C tokens. This constrains the illumination field to be somewhat smooth, as opposed to piecewise constant throughout a token.

Figure 7:
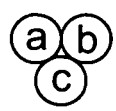
FIG. 7 is a representation of an [A][x]=[b] matrix relationship used to identify and separate illumination and material aspects of an image, according to a same-material constraint feature of the present invention.

FIG. 7 is a representation of an [A][x]=[b] matrix relationship used to identify and separate illumination and material aspects of an image, according to a same-material constraint feature taught by U.S. Patent Publication No. US 2010/0142825. Based upon the previously discussed I=ML equation, $\log(I)=\log(ML)=\log(M)+\log(L)$. This can be restated as $i=m+l$, wherein i represents $\log(I)$, m represents $\log(M)$ and l represents $\log(L)$. In the constraining relationship of a same material, in an example where three Type C tokens, a, b and c, (as shown in FIG. 7) are within the region of single reflectance, as determined by the token size analysis, $m_a=m_b=m_c$. For the purpose of this example, the I value for each Type C token is the average color value for the recorded color values of the constituent pixels of the token.

Since: $m_a=i_a-l_a$, $m_b=i_b-l_b$, and $m_c=i_c-l_c$ these mathematical relationships can be expressed, in a same material constraint, as $(1)l_a+(-1)l_b+(0)l_c=(i_a-i_b)$, $(1)l_a+(0)l_b+(-1)l_c=(i_a-i_c)$ and $(0)l_a+(1)l_b+(-1)l_c=(i_b-i_c)$.

Thus, in the matrix equation of FIG. 7, the various values for the log(I) ($i_a$, $i_b$, $i_c$), in the [b] matrix, are known from the average recorded pixel color values for the constituent pixels of the adjacent Type C tokens a, b and c. The [A] matrix of 0's, 1's and −1's is defined by the set of equations expressing the same material constraint, as described above. The number of rows in the [A] matrix, from top to bottom, corresponds to the number of actual constraints imposed on the tokens, in this case three, the same material constraint between the three adjacent Type C tokens a, b and c. The number of columns in the [A] matrix, from left to right, corresponds to the number of unknowns to be solved for, again, in this case, the three illumination values for the three tokens. Therefore, the values for the illumination components of each Type C token a, b and c, in the [x] matrix, can be solved for in the matrix equation. It should be noted that each value is either a vector of three values corresponding to the color bands (such as red, green, and blue) of our example or can be a single value, such as in a grayscale image.

FIG. 8 is a representation of an [A][x]=[b] matrix relationship used to identify and separate illumination and material aspects of an image, according to a smooth-illumination constraint feature of the present invention. In the [b] matrix of FIG. 8, the $d_{ab}$, $d_{ac}$, and $d_{bc}$ terms are each an expression of the log difference between values for pixels along a boundary between adjacent tokens. The CPU 12 examines pairs of pixels along a boundary, for example, for the term $d_{ab}$, the CPU 12 examines pixel pairs, one pixel per token, along the boundary between token a and token b. The CPU 12 records the difference in log image values for each pair, and then aggregates the recorded values for a single difference of log values for the token pair. The aggregation procedure can be implemented as a mean, median, mean shift or any other standard distribution characterization.

In a standard least squares solver, the matrix equations of FIGS. 7 and 8 are concatenated, and the resulting matrix array (with the matrix of FIG. 7 representing all Type C tokens of the dominant region and the matrix of FIG. 8 representing all adjacent Type C tokens of the image file 18), is restated as min over x of $(Ax-b)^2$. The CPU 12 then executes the least squares operation to simultaneously determine optimized values for each of $l_a$, $l_b$ and $l_c$. The CPU 12 can then proceed to generate and display an illumination image based upon the optimal $l_a$, $l_b$ and $l_c$ values. The CPU 12 operates to find a solution that maximally makes all of the Type C tokens (or pixels) in the dominant region the same color while simultaneously making the illumination field as smooth as possible across all adjacent Type C tokens in the image. In general, the CPU 12 is operated to weigh the constraints such that violating the same-material constraints is very expensive relative to violating the smooth illumination constraints. This makes sure that the solution to the over-constrained system of equations results in the tokens (or pixels) in the same-material dominant region being almost perfectly a uniform color.

To obtain the illumination image, the $l_a$, $l_b$ and $l_c$ optimized values are substituted for the originally recorded RGB values, for each pixel of the respective tokens. As noted above, the matrix equation is arranged to express a same-material constraint between all of the Type C tokens identified as being in the dominant region of single reflectance, and a smooth-illumination constraint between all adjacent pairs of Type C tokens in the image of the image file 18. The CPU 12 can proceed to also generate a material image by calculating the $m_a$, $m_b$, $m_c$ values from the known recorded image values $i_a$, $i_b$, $i_c$, and the determined $l_a$, $l_b$ and $l_c$ values, utilizing the model expressed by $i=m+l$.

Returning once again to FIG. 3, in step 1006, the CPU 12 performs post processing, such as, for example, a factoring of the illumination to provide an image illuminated by diffuse illumination, to optimize the appearance of, for example, a face depicted in the original image, for improved performance of a face recognition task, or for the performance of any processing wherein curvature information is important. Known face recognition algorithms utilize curvature information indicated by shading in the image. The curvature information is most accurately depicted when there is diffuse illumination across the image such that illumination variation is caused by changes in the geometry of the face, and not by strong cast shadows from the brow, nose, or from external sources such as hats.

In the performance of the operations to segregate the image into illumination and material aspects of the image, the resulting material image does not contain any curvature information, and the resulting illumination image contains both curvature information and potentially undesirable illumination effects such as cast shadows and strong trends that can make one side of an image brighter than the other side, for example, when a face is lit from one side.

According to a feature of the present invention, in step 1006, a post processing operation can be performed to factor, for example, the illumination image so as to separate the diffuse shading aspects of the illumination image from the cast shadow and strong trend aspects of the illumination image. To that end, the CPU 12 is operated to perform an edge preserving blurring filter operation. For example, a bilateral filter can be applied to the illumination image to naturally preserve the sharp transitions due to cast shadows and strong trends. If the filter is applied several times in succession, for example, three or four times, the slowly-varying curvature will be removed from the illumination image, while the transitions due to cast shadows and strong trends will be retained in the modified illumination image.

In an exemplary embodiment of the present invention, the CPU 12 applies a bilateral filter to a log illumination image, one or more times in succession. The resulting blurred log illumination image, showing only cast shadows and strong trends, is then subtracted from the original log illumination image to provide a log diffuse shading illumination image. The log diffuse shading illumination image is then added to a log material image to generate a version of the original image as it would appear if originally illuminated by diffuse illumination. The subtraction and addition in log space is equivalent to dividing and multiply images in the original color space, such as RGB space.

In the event that only a diffuse-looking result image is needed for further processing (and not the diffuse illumination field separately), such as a face recognition operation, an edge preserving blurring technique can be applied to the illumination image, as described above, and then the original image is divided by this processed illumination image (or subtracted in log space) to obtain an image that appears like it was taken in diffuse conditions. This is mathematically equivalent to multiplying the diffuse shading by the reflectance image.

As an alternative to the bilateral filter, the CPU 12 can apply a mean shift procedure, anisotropic diffusion, or any other similar method that preserves potentially undesirable illumination effects, to provide a resulting image showing the cast shadow and strong trend aspects of the illumination image. The resulting image can then be manipulated with the original illumination image to generate a diffuse illumination image showing curvature information.

Similarly, a known retinex method can be implemented. A retinex operation removes small gradients, while retaining large gradients. Cast shadows cause large gradients, while curvature shading causes small gradients. Thus, a retinex method can be used as an edge preserving technique to separate the diffuse shading aspects of the illumination image from the cast shadow and strong trend aspects of the illumination image.

In a further exemplary embodiment of the present invention, a diffuse illumination image can be obtained by using an edge masking and reintegration technique. A known edge detection method, such as, for example, a Canny edge detection, is implemented by the CPU 12 to detect edges in an illumination image. The CPU 12 then calculates a gradient field for the illumination image, and sets the gradients for pixels along each detected edge to zero. The gradient field, as modified to zero out edge pixel gradients, is then reintegrated into the original illumination image to provide a diffuse illumination image. The reintegration can be performed utilizing any well known image reintegration technique, for reintegrating a gradient field into an image, such as, for example, a Poisson solver.

In accordance with another exemplary embodiment of the present invention, a multi-class illumination edge classifier is used by the CPU 12 to classify image edges so as to identify edges in the image being processed, for example, that are either not due to illumination (solely due to material reflectance change), due solely to illumination (for example, edges that cause potentially undesirable illumination effects such as cast shadows and strong trends), or due to both illumination and material/reflectance change (thus providing, for example, important curvature information). In this manner, for example, a process to generate a diffuse image is enhanced by providing a more accurate identification of both pure illumination edges that cause the potentially undesirable cast shadows and strong trends, and edges exhibiting partial illumination and material/reflectance change. Moreover, a shadow removal or modification method is also improved by providing a more accurate identification of pure illumination edges. The multiple class classification thus enables a classification of computer actions such as edge removal and edge reduction, relative to the type of edge, that result in a more accurate generation of a diffuse image, or an improved method for a more accurate shadow removal or modification.

In the exemplary embodiment of the present invention, image edge features for training a classifier are based upon a scaled, shifted sigmoid fit. Theoretically, features derived from any model that captures an expected shape of illumination change across an edge (for example, splines, polynomials, etc.), can be implemented to classify image edges.

Figure 10A:
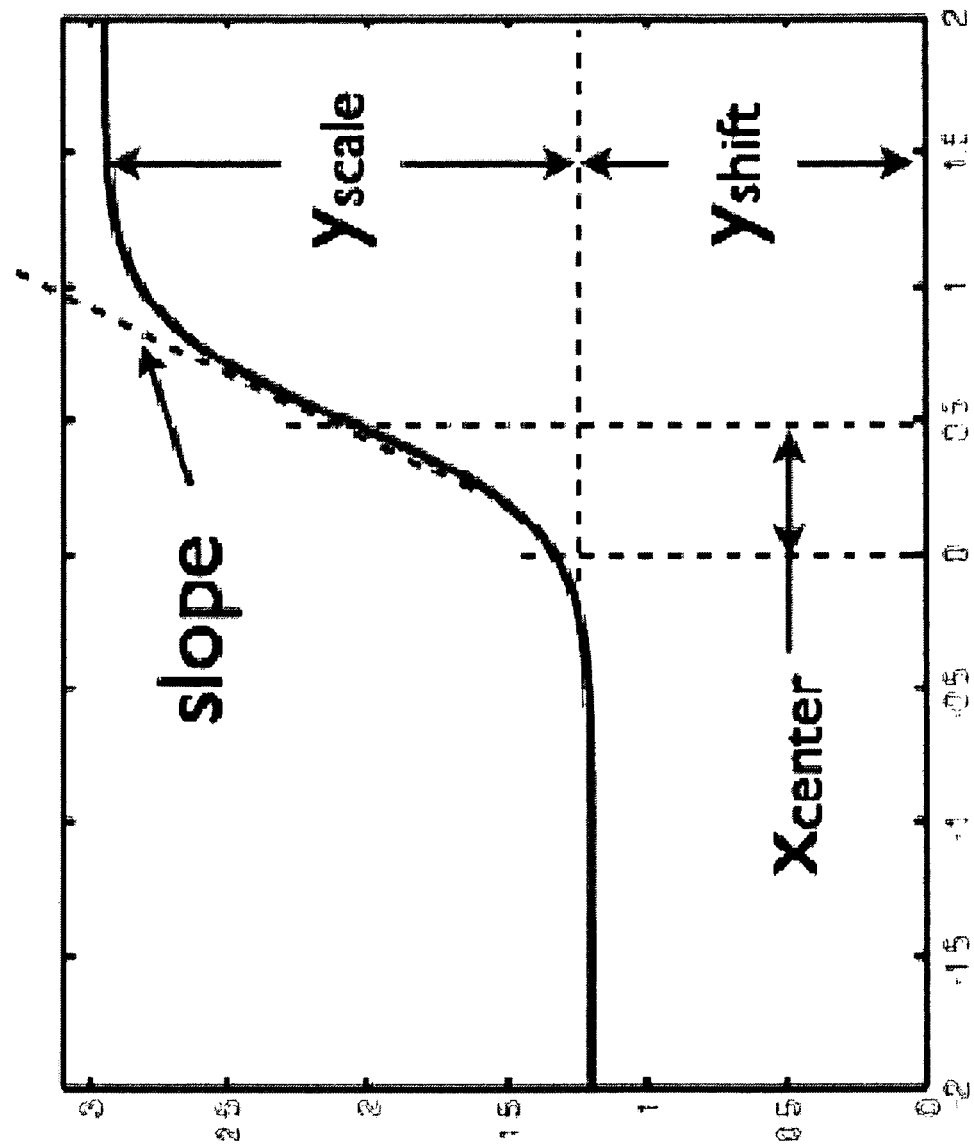
FIG. 10a is a graph depicting a typical sigmoid fit for an illumination edge, with an illustration of sigmoid parameters used to classify illumination edges in the flow chart routine of FIG. 9.

FIG. 10a shows a graph depicting a typical sigmoid fit model representative of an illumination edge, with an indication of four sigmoid parameters that can be utilized as a basis to classify edges as being, for example, either due solely to illumination, only partially due to illumination or due to material/reflectance change. The parameters include:

xcenter—the center of the sigmoid (corresponding approximately to the center of the edge);

slope—the slope or steepness of the sigmoid (the rate of change in intensity relative to distance);

yscale—the difference between the flat bright and dark portions of the sigmoid; and yshift—the vertical shift (in intensity) required to align the sigmoid with a dark portion of underlying data.

For an edge analysis based upon a sigmoid fit, the underlying data are an edge pixel, selected along an image edge to be classified, and profile pixels extending perpendicular to the edge, from the selected edge pixel, on either side of the edge, to represent the illumination profile across the respective image edge. The underlying data are plotted. The plot includes a separate plot for each of the red, green and blue bands (RGB values) of each of the selected edge pixel and the profile pixels (illustrated as dots), and a corresponding sigmoid fit (illustrated as a solid line), as shown in FIG. 10b.

In FIG. 10b, the vertical axis represents image intensity, and the horizontal axis represents pixel distance from the edge being classified, with a dot at zero representing the selected edge pixel. Each corresponding sigmoid model is fit by the CPU 12 using any number of known numerical techniques for finding parameters of the model that best match the model to observed data, such as the RGB values of the edge and profile pixels plotted in FIG. 10b. The numerical techniques include, for example, a least squares optimization implemented via a Generalized Linear Model (GLM), an iterative optimization algorithm, such as, for example, Levenberg-Marquardt, or a combination of the two known techniques. When a combination of the techniques is implemented, the CPU 12 initializes the iterative technique with the result of a GLM fit.

According to the exemplary embodiment of the present invention, a multiple class classifier, for classifying an edge as either solely or partially due to illumination, or a material edge, is trained by the CPU 12 using image features relevant to illumination effects, that are derived from the sigmoid model. The image features include the four basic parameters of the sigmoid fit, as described above, and other features computed as a function of the four basic parameters. The features include:

(1) The raw fit parameters (xcenter, slope, yscale, yshift) per color band [4 parameters×3 bands (RGB)=12 features];
(2) Normalized residual of data to fitted profile [3 bands] (the normalized residual is a measure of the normalized error— that is how far the actual data points are from the sigmoid);
(3) Comparisons of slope:
 (a) Difference between slopeR, slopeG and slopeB [3 bands]
 (b) Ratio of scale to slope (how tall v how steep) [3 bands];
(4) Comparisons of xcenters (difference between all pairs of xcenters (RGB) [3 bands];
(5) Color information for the yscale of the respective edge (hue, saturation, normalized RGB) [5 values];
(6) Color information for the yshift of the respective edge (hue, saturation, normalized RGB) [5 values] (note that "normalized RGB" means each color band divided by the sum across the color bands);
(7) Edge strength measured by gradient magnitude at the edge point;
(8) Angle (gradient orientation)—potentially an angle relative to a known angle, such as, for example, the orientation of a face depicted in the image;
(9) Edge position (x,y), potentially, in normalized coordinates, for example, scaled by interocular distance in the case of a face; and
(10) Slope of a simple line fit to the profile (and residual of the line fit).

It should be noted that additional features can be derived from parameters of a different model fit to the residual of the original fit. In this case, the CPU 12 operates to model the intensity profile y with a sigmoid $y_{sigmoid}$, then proceeds to compute the residual $r=y-y_{sigmoid}$, fit a model to r and use fit parameters as additional features. For example, after fitting a sigmoid model for an illumination edge identified on skin depicted in a face image, at a location exhibiting significant sub-surface scattering, the CPU 12 can utilize an undershoot/overshoot pattern as a basis to inform a classification decision.

Figure 9:
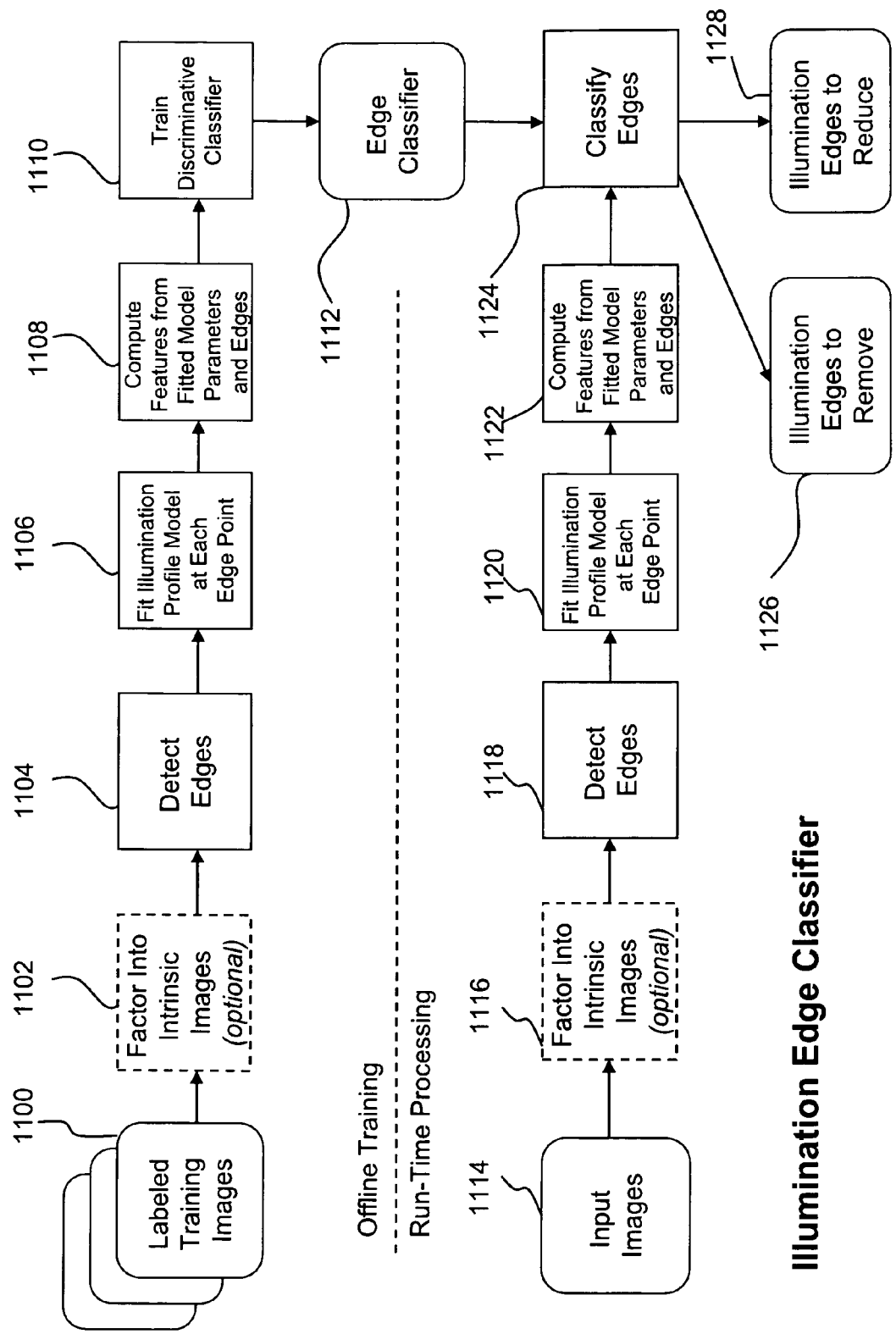
FIG. 9 is a flow chart for training and using an illumination edge classifier, according to a feature of the present invention.

FIG. 9 is a flow chart for training and using an illumination edge classifier, according to a feature of the exemplary embodiment of the present invention. The classifier can be implemented in the CPU 12 using any of the known automatic computer classifiers, such as, for example, Support Vector Machines or Boosted Decision Trees. In step 1100, in an offline training operation, a set of labeled training images is input to the CPU 12. The labeled training images includes image files 18, wherein each image file of the training set is manually coded to indicate edges depicted in the respective image file 18 that are to be used in the training.

In the exemplary embodiment of the present invention, the coding is a color coding wherein a human operator views each image file of the training set, and assigns a label, using a graphical user interface, to mark off each edge to be used in the training, for example, assigning a different arbitrary color to each marked region, as a function of the type of edge. For example, a distinct color can be assigned as a descriptive label for each of a material edge, shadow edge (pure illumination), contour or geometric edge (partial illumination and material/reflectance), specularity and so on.

In an alternative exemplary embodiment, a system such as Mechanical Turk can be provided to the human operator, as a mechanism for labeling the training set.

After the images of the training set have been labeled and input to the CPU 12, the CPU 12 proceeds to step 1102. In step 1102, the CPU 12 optionally operates to perform the processes described above to generate intrinsic images (illumination and material images) corresponding to the images depicted in the image files 18 of the training set. The training can be performed relative to the original images, the intrinsic images, or a combination of both types of images.

In step 1104, the CPU 12 operates to detect the labeled edges of the images of the training set, for example, as a function of the color codes. In step 1106, the CPU 12 selects a representative edge pixel from each detected edge and, for each selected edge pixel, selects a set of profile pixels extending perpendicular to the edge, from the respective selected edge pixel, on either side of the edge, to represent the illumination profile across each respective image edge. The CPU 12 then operates to fit a sigmoid model to each color band in a respective plot of each illumination profile, as illustrated in FIG. 10b, implementing a known numerical technique for finding parameters for each fit, as described above.

In step 1108, the CPU 12 computes, for each edge point, a set of features, for example, the ten types of features described above, to provide sets of features that correspond to the types of edges specified in the training set, for example, material edge, shadow edge, contour or geometric edge, and so on. All of the features computed for each edge point are concatenated into a feature vector for that edge point, to provide a feature vector for each edge. In this manner, according to a feature of the present invention, feature vectors can be calculated relative to illumination effects in the image, for example, indicative of a shadow edge (pure illumination) as opposed to a contour or geometric edge (partial illumination and material/reflectance change), and so on. The subsequent training, thus, enables a multiple class classification to thereby identify computer actions appropriate, relative to the type of edge, for a more accurate generation of a diffuse image and/or shadow removal or modification.

In step 1110, the CPU 12 utilizes the feature vectors to train a discriminative classifier, for example, according to a known computer learning technique, such as, for example, Support Vector Machines or Boosted Decision Trees. The edge classifier is output in step 1112.

According to a feature of the present invention, the multi-class edge classifier output in step 1112 is utilized by the CPU 12 in a run-time operation. In step 1114, an image file 18 is input to the CPU 12. The images input to the CPU 12 can be an original image, a material image, an illumination image, or a sequence of any combination of image types. Moreover, in step 1116, the CPU 12 optionally operates to perform the processes described above to generate intrinsic images from an original input image.

In step 1118, the CPU 12 executes an edge detection, such as, for example, a Canny edge detector, to identify the pixels that define image edges in the input image, and/or the corresponding intrinsic images. More complex edge detection techniques can be implemented to detect edges based upon multiple cues, such as, for example, color and texture.

In steps 1120 and 1122, the CPU 12 performs the same functions as in steps 1106 and 1108, to generate feature vectors for edge points of the edges of the input image detected in step 1118.

In step 1124, the CPU 12 applies the edge classifier trained in the off-line operation (step 1110) to the feature vectors for the input image, to classify each edge of the image depicted in the input image. The classification can be in the form of a score, for example, of from 0 to 1, with a score of 0 for an edge of the image corresponding to no likelihood that the edge is an edge of a particular type (for example, pure illumination edge or partial illumination and material/reflectance), a 1 corresponding to a high likelihood that the edge is of the respective type. A threshold value can be selected, for example, 0.8, such that each edge with a score that is above 0.8 is considered an edge of the respective type. As noted above, according to a feature of the present invention, the classification is according to a multiple class operation to identify computer actions to be taken, determined as a function of illumination effects observed at the edge in the image.

For example, when the classifier classifies an edge as due entirely to illumination, the classification indicates a CPU action for removal of the edge from the image. When the classifier classifies an edge as due to both illumination and material/reflectance change, the classification indicates a CPU action to reduce the contrast at the edge to eliminate the effect of illumination while preserving the effects that provide an indication of a material/reflectance change in the image at the edge location. When the classification indicates a material edge, the edge is left unaltered.

A multiple class classifier operation, such as provided by the exemplary embodiment of the present invention, can be implemented using a number of different classification methods. For example, the classification can be made relative to the type of edge (shadow, geometric, material, etc.) that is then translated by the CPU 12 to a corresponding action. This can be implemented by translating the edge type to the corresponding action prior to training to provide action classifiers. Alternatively, the CPU 12 is operated to train a set of classifiers, one for each type of edge, and is then operated to translate each classification output to the corresponding action.

Each of these implementations can be achieved via several different training methods. In a first method, the CPU 12 is operated to train a single, multi-class classifier (for example, Random Forest). The single multi-class classifier can directly assign one of the actions or types, as a function of the features. In a second method, the CPU 12 is operated to train a set of binary, one-vs-all classifiers. Each classifier of the set is trained for one of the specific types of edges (shadow, material, etc.). Each edge is classified by each of the set of classifiers, and a final classification for a specific edge is a consensus from the set of classifications, for example, the classification with the highest confidence among the set of classifications, relative to corresponding threshold values.

According to a third method, the CPU 12 is operated to train a cascade classifier. For example, the classifier includes a first level of classification, indicating a pure illumination edge for removal, when the classifier is above a threshold value for pure illumination. When an edge is classified as pure illumination, at the first level, the edge is removed from further classification analysis. If that edge is not classified as pure illumination, the edge continues to a second level of the cascade. At the second level, the classification is relative to a CPU action to reduce the contrast at the edge, and so on.

In an alternative exemplary embodiment, the multi-class classification is implemented as a learned regression model. In the alternative embodiment, the classifier is trained to learn a reduction factor as a function of the feature vectors. Thus, rather than provide a discrete set of classification labels (edge type or computer action), the classification outputs, for example, a real-valued gradient reduction factor. Accordingly, the removal of an edge is executed by setting, as a classification output, a gradient scaling factor to zero, with an edge contrast reduction having a classification output that is a non-zero scaling factor less than 1, with a scaling factor of 1 corresponding to leaving the edge as is.

As a further feature of the present invention, the CPU 12 is operated to propagate the classifications of edge pixels spatially along the edges to which the edge pixel belong. For example, the CPU 12 applies a 1D filter, for example, a 1D median filter, to the classifications of the edge points along each edge.

Upon classification of the edges of an input image in terms of computer actions, any number of known methods can be executed by the CPU 12 to achieve the desired removal/reduction actions. For example, the CPU 12 can perform the edge masking and reintegration technique described above. Moreover, the technique can be executed with respect to the original image and/or the corresponding illumination and material images, regardless of the image used to make the edge classification (original or corresponding intrinsic images).

In the case of execution of the computer actions in the original image, the CPU 12 executes the edge removal/reduction actions, as indicted by the classifications, to remove cast shadows and strong trends, while preserving contour information. In the case of execution of the computer actions in a corresponding illumination image, the result is an estimate of a diffuse illumination for the scene depicted in the image. After processing of the computer actions, the illumination image can be reapplied to the material image, to generate a diffuse image, as described above. The CPU 12 can also be operated to execute the removal/reduction actions in the corresponding material image. Some illumination effects can remain in the material image due to an imperfect separation of the illumination and material aspects in the original image. An execution of the removal/reduction actions by the CPU 12 in both the illumination and material images provides a more accurate generation of a diffuse image.

Returning once again to FIG. 3, in step 1008, the CPU 12 outputs the image generated in the post-processing of step 1006, for further processing, as for example, a diffuse image for input to a face recognition process.

In the preceding specification, the invention has been described with reference to specific exemplary embodiments and examples thereof. It will, however, be evident that various modifications and changes may be made thereto without departing from the broader spirit and scope of the invention as set forth in the claims that follow. The specification and drawings are accordingly to be regarded in an illustrative manner rather than a restrictive sense.

What is claimed is:

1. An automated, computerized method for processing an image, comprising the steps of:
providing an image file depicting an image, in a computer memory;
providing a multi-class classifier trained to identify edges in an image as a function of illumination effects in the image including identifying whether the edges have a first illumination effect or a second illumination effect;
utilizing the multi-class classifier to automatically label edges in the image, the automatically labeling including labeling the edges having the first illumination effect to indicate the edges having the first illumination effect are to be removed from the image, the automatically labeling including labeling the edges having the second illumination effect to indicate the edges having the second illumination effect are to be reduced in the image, and
removing the edges having the first illumination effect from the image and reducing the edges having the second illumination effect in the image,
wherein the reducing the edges having the second illumination in the image includes reducing contrast at the edges to eliminate the illumination effect while preserving effects that provide an indication of a material/reflectance change in the image at the edges.

2. The method of claim 1 wherein the multi-class classifier is selected from a group including a single multi-class classifier, a set of binary, one-vs-all classifiers and a cascade classifier.

3. The method of claim 1 wherein the multi-class classifier is trained to identify edge types, and including the step of translating each edge type to a corresponding computer action.

4. The method of claim 1 wherein the step of removing the edges having the first illumination effect from the image and reducing the edges having the second illumination effect in the image is performed in respect to an image selected from the group including an original image and corresponding intrinsic images.

5. The method of claim 1 wherein the image is selected from the group including an original image and corresponding intrinsic images.

6. The method as recited in claim 1 wherein the multi-class classifier is trained to identify edges as being due to illumination, as being due to material and as being due to material and illumination, the edges having the first illumination effect being edges due to illumination, the edges having the second illumination effect being edges due to material and illumination.

7. The method as recited in claim 6 wherein the multi-class classifier is utilized to automatically label the edges having the first illumination effect as edges being due to illumination.

8. The method as recited in claim 6 wherein the multi-class classifier is utilized to automatically label the edges having the second illumination effect as being due to material and illumination.

9. The method as recited in claim 6 wherein the multi-class classifier is utilized to automatically label edges as being due to material, the edges labeled as being due to material being left unaltered by the multi-class classifier.

10. The method as recited in claim 1 further comprising executing computer action as a function of the labeling of the edges having the first illumination effects and the edges having the second illumination effects to remove cast shadows and strong trends, while preserving contour information.

11. The method as recited in claim 1 wherein the providing the multi-class classifier trained to identify edges in the image as a function of illumination effects in the image includes defining an illumination profile for each of the edges, the illumination profile including color bands representing illumination in the image, the illumination effects being based on the illumination profiles.

12. A computer system which comprises:
a CPU; and
a memory storing an image file containing an image;
the CPU arranged and configured to execute a routine to provide a multi-class classifier trained to identify edges in an image as a function of illumination effects in the image including identifying whether the edges have a first illumination effect or a second illumination effect and utilize the multi-class classifier to automatically label edges in the image, the automatically labeling including labeling the edges having the first illumination effect to indicate the edges having the first illumination effect are to be removed from the image, the automatically labeling including labeling the edges having the second illumination effect to indicate the edges having the second illumination effect are to be reduced in the image, the CPU arranged and configured to execute a routine to remove the edges having the first illumination effect from the image and reduce the edges having the second illumination effect in the image by reducing contrast at the edges to eliminate the illumination effect while preserving effects that provide an indication of a material/reflectance change in the image at the edges.

13. A computer program product, disposed on a non-transitory computer readable media, the product including computer executable process steps operable to control a computer to: provide an image file depicting an image, in a computer memory, provide a multi-class classifier trained to identify edges in an image as a function of illumination effects in the image including identifying whether the edges have a first illumination effect or a second illumination effect and utilize the multi-class classifier to automatically label edges in the image, the automatically labeling including labeling the edges having the first illumination effect to indicate the edges having the first illumination effect are to be removed from the image, the automatically labeling including labeling the edges having the second illumination effect to indicate the edges having the second illumination effect are to be reduced in the image, the product further including computer executable process steps operable to control a computer to remove the edges having the first illumination effect from the image and reduce the edges having the second illumination effect in the image by reducing contrast at the edges to eliminate the illumination effect while preserving effects that provide an indication of a material/reflectance change in the image at the edges.

14. The computer program product of claim 13 wherein the multi-class classifier is selected from a group including a single multi-class classifier, a set of binary, one-vs-all classifiers and a cascade classifier.

15. The computer program product of claim 13 wherein the multi-class classifier is trained to identify edge types, and including the further process step of translating each edge type to a corresponding computer action.

16. The computer program product of claim 13 including the further process step of executing the identified computer actions in the image.

17. The computer program product of claim 16 wherein the process step of executing the identified computer actions in the image is performed in respect to an image selected from the group including an original image and corresponding intrinsic images.

18. The computer program product of claim 13 wherein the image is selected from the group including an original image and corresponding intrinsic images.

19. An automated, computerized method for processing an image, comprising the steps of:
- providing an image file depicting an image, in a computer memory;
- providing a multi-class classifier trained to identify edges in an image as a function of illumination effects in the image including identifying whether the edges have a first illumination effect or a second illumination effect; and
- utilizing the multi-class classifier to automatically label edges in the image, the automatically labeling including labeling the edges having the first illumination effect to indicate the edges having the first illumination effect are to be removed from the image, the automatically labeling including labeling the edges having the second illumination effect to indicate the edges having the second illumination effect are to be reduced in the image, and
- removing the edges having the first illumination effect from the image and reducing the edges having the second illumination effect in the image,
- wherein the removing the edges having the first illumination in the image includes setting, as a classification output, a gradient scaling factor to zero.

20. The method as recited in claim 19 wherein the reducing the edges having the second illumination in the image includes reducing contrast at the edges to eliminate the illumination effect while preserving effects that provide an indication of a material/reflectance change in the image at the edges.

* * * * *